United States Patent
Bjorge et al.

(10) Patent No.: US 11,619,012 B2
(45) Date of Patent: Apr. 4, 2023

(54) ROTOR DEPTH VISUAL INDICATION ZONES

(71) Applicant: Caterpillar Paving Products Inc., Brooklyn Park, MN (US)

(72) Inventors: Jason R. Bjorge, Andover, MN (US); Sean Robert Laclef, Plymouth, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 212 days.

(21) Appl. No.: 16/905,319

(22) Filed: Jun. 18, 2020

(65) Prior Publication Data
US 2021/0395962 A1   Dec. 23, 2021

(51) Int. Cl.
*E01C 23/088* (2006.01)
*E01C 23/12* (2006.01)
*E01C 23/06* (2006.01)
*B60R 1/00* (2022.01)
*F21W 111/00* (2006.01)
*F21S 4/28* (2016.01)

(52) U.S. Cl.
CPC .......... *E01C 23/088* (2013.01); *E01C 23/065* (2013.01); *E01C 23/127* (2013.01); *B60R 1/00* (2013.01); *B60R 2300/80* (2013.01); *F21S 4/28* (2016.01); *F21W 2111/00* (2013.01)

(58) Field of Classification Search
CPC ............. E01C 23/088; E01C 23/23127; E01C 23/065; E01C 23/0933; E01C 23/0946; E01C 23/0993; F21S 4/28; B60R 1/00; B60R 2300/80; F21W 2111/00
USPC .......................................................... 701/50
See application file for complete search history.

(56) References Cited

U.S. PATENT DOCUMENTS

| 7,905,682 B2 | 3/2011 | Holl et al. |
| 10,377,311 B2 | 8/2019 | Kröll et al. |
| 2009/0010713 A1* | 1/2009 | Kotting .............. E01C 23/088 404/128 |
| 2012/0090909 A1* | 4/2012 | Menzenbach ......... E01C 23/088 348/148 |
| 2014/0348584 A1* | 11/2014 | Fritz .................... E01C 23/127 404/72 |
| 2016/0060826 A1* | 3/2016 | Berning ............... E01C 23/127 299/1.5 |

(Continued)

FOREIGN PATENT DOCUMENTS

| CN | 109837827 A | 6/2019 |
| JP | 2018044281 | 3/2018 |

*Primary Examiner* — Abby J Flynn
*Assistant Examiner* — Michael A Goodwin
(74) *Attorney, Agent, or Firm* — Schwegman, Lundberg & Woessner (57) ABSTRACT

A cold planer can include a frame; an operator station coupled to the frame and including a monitor; a cutting rotor coupled to the frame, the cutting rotor configured to be lowered a selected distance into a surface to define a depth of cut; a conveyor to receive material from the cutting rotor; and a cutting rotor location indication system including: a camera coupled to the frame and oriented to show an area on a side of the frame; and a visual indicator system configured to receive a first image from the camera and display on the monitor a visual image of a location of a leading edge and a trailing edge of the cutting rotor relative to the surface.

19 Claims, 7 Drawing Sheets

(56) References Cited

U.S. PATENT DOCUMENTS

| | | |
|---|---|---|
| 2018/0051427 A1* | 2/2018 | Lee .......................... B60Q 1/26 |
| 2018/0209105 A1* | 7/2018 | Berning .................. B05B 15/60 |
| 2018/0223503 A1 | 8/2018 | Imano |
| 2019/0024328 A1* | 1/2019 | Stahl ....................... E01C 23/01 |
| 2019/0210525 A1* | 7/2019 | Laclef ....................... B60R 1/00 |

* cited by examiner

ROTOR DEPTH VISUAL INDICATION ZONES

TECHNICAL FIELD

The present disclosure generally relates to a milling machine. More particularly, the present disclosure relates to a system and method for determining the location of the cutting rotor.

BACKGROUND

Milling machines can include machines such as cold planers and reclaimers. For example, cold planers are powered machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As power from the power source is transferred to the milling assembly, this power is further transferred to the cutting rotor, thereby rotating the cutting rotor about its axis. As the rotor rotates, its cutting bits engage the hardened asphalt, concrete or other materials of an existing surface of a paved area, thereby removing layers of these existing structures. The spinning action of the cutting bits transfers these removed layers to the conveyor system which transports the removed material to a separate powered machine such as a haul truck for removal from a work site.

On some milling machines, the side plates of the drum housing are not visible from the operator station making it hard to line up with obstacles or lines to cut. Also, being able to see helps determine the cutting rotor location at varying cut depths.

US 2019/0210525 discusses a machine including one or more cameras to provide a visual display showing the current position and the current direction of the machine.

SUMMARY

In an example according to this disclosure, a cold planer can include a frame; an operator station coupled to the frame and including a monitor; a cutting rotor coupled to the frame, the cutting rotor configured to be lowered a selected distance into a surface to define a depth of cut; a conveyor to receive material from the cutting rotor; and a cutting rotor location indication system including: a camera coupled to the frame and oriented to show an area on a side of the frame; and a visual indicator system configured to receive a first image from the camera and display on the monitor a visual image of a location of a leading edge and a trailing edge of the cutting rotor relative to the surface.

In one example, a milling machine can include a frame; an operator station coupled to the frame and including a monitor; a cutting rotor coupled to the frame, the cutting rotor configured to be lowered a selected distance into a surface to define a depth of cut; a cutting rotor location indication system including: a camera coupled to the frame and oriented to show an area on a side of the frame; and a visual indicator system configured to receive a first image from the camera and display on the monitor a visual image of a location of a leading edge and a trailing edge of the cutting rotor relative to the surface.

In one example, a method for of providing a cutting rotor location to an operator of a milling machine can include coupling a camera to a frame of the milling machine, the camera positioned to capture a first image of an area proximate a cutting rotor of the machine; and displaying on a monitor in an operator station of the milling machine a visual image of a location of a leading edge and a trailing edge of the cutting rotor relative to a cutting surface.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
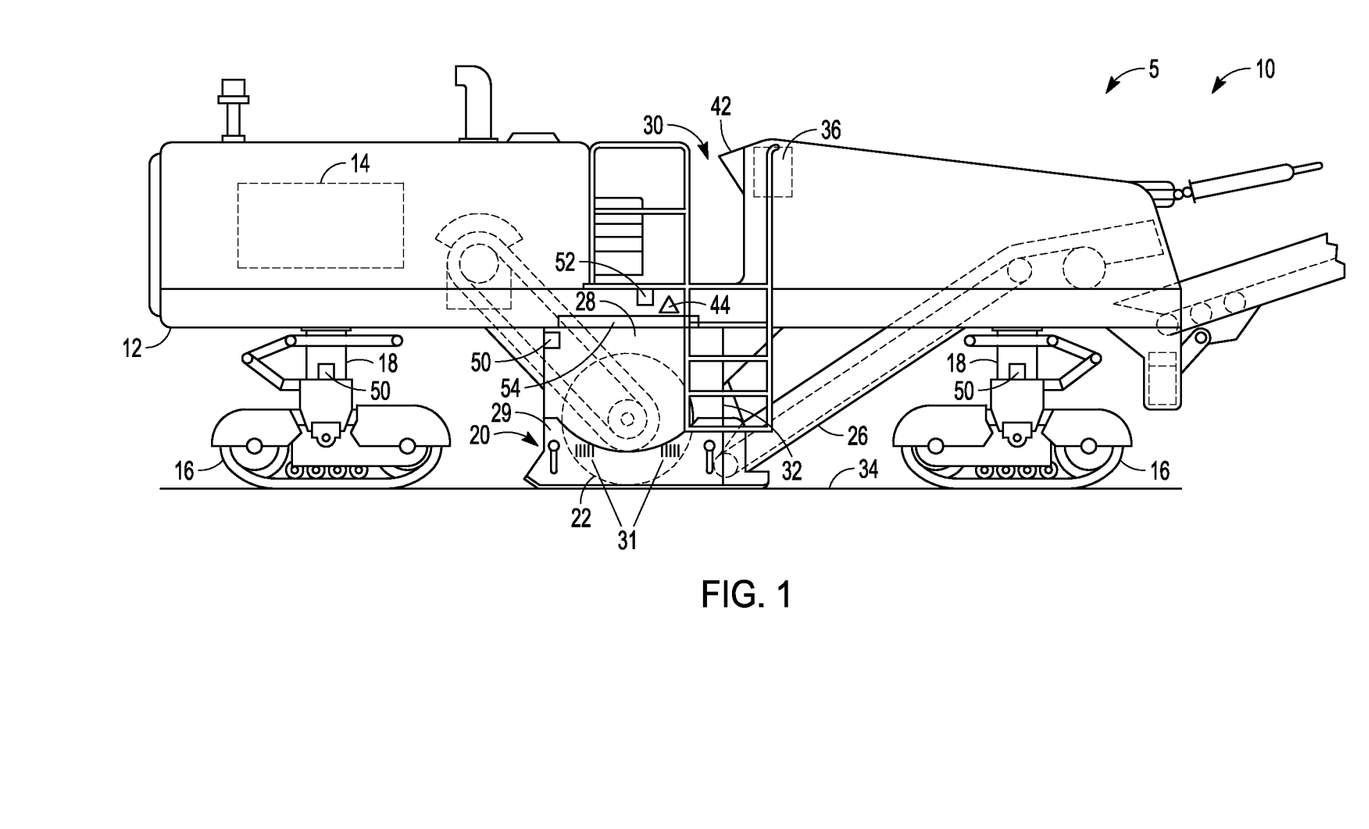
FIG. 1 shows a side view of a milling machine, in accordance with one embodiment.

FIG. 1 shows a side view of a milling machine 5, in accordance with one embodiment. In this example, the milling machine 5 is a cold planer 10. The cold planer 10 includes a frame 12, and a power source 14 connected to the frame 12. The power source 14 may be provided in any number of different forms including, but not limited to, Otto and Diesel cycle internal combustion engines, electric motors, hybrid engines and the like.

The frame 12 is supported by transportation devices 16 via lifting columns 18. The transportation devices 16 may be any kind of ground-engaging device that allows to move the cold planer 10 in a forward direction over a ground surface 34, for example a paved road or a ground already processed by the cold planer 10. For example, in the shown embodiment, the transportation devices 16 are configured as track assemblies. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum axis extending in a direction perpendicular to the frame axis. As the rotatable cutting rotor 22 spins about its drum axis, cutting bits on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the rotatable drum 22 and its cutting bits then transfers the hardened materials to a first stage conveyor 26 via a discharge port 32 on the drum housing 28. The first stage conveyor 26 can be coupled to the frame 12 and located at or near the discharge port 32.

To lower the cutting rotor 22 into the surface, the lifting columns 18 are adjusted accordingly to allow the for the desired depth of cut. One or more sensors 50 can be located on the frame 12 to sense the position of the lifting columns 18 and can deliver that information to a controller 36 to determine the depth of cut of the cutting rotor 22. In another example, the sensor 50 can be attached to a side plate 29 of the machine to determine the depth of the cutting rotor 22.

The drum housing 28 includes front and rear walls, and a top cover positioned above the cutting rotor 22. Furthermore, the drum housing 28 includes side plates 29 on the left and right sides of the cutting rotor 22 with respect to a travel direction of the cold planer 10. The drum housing 28 is open toward the ground so that the cutting rotor 22 can engage in the ground from the drum housing 28. The drum housing includes the discharge port 32 in a front wall to discharge material to the first stage conveyor 26, which is located at or near the discharge port 32.

The cold planer 10 further includes an operator station or platform 30 including a control panel for inputting commands to a control system for controlling the cold planer 10, and a monitor 42 to display images to the operator.

As noted above, on some milling machines, the side plates of the drum housing are not visible from the operator station making it hard to line up with obstacles or lines to cut. Also, being able to see helps determine the cutting rotor location at varying cut depths.

Accordingly, the present system provides a cutting rotor location indication system. For example, the system can include a camera 44 coupled to the frame 12 and oriented to show an area on a side of the frame 12 proximate the area next to the cutting rotor 22 such that the camera 44 shows the ground next to the cutting rotor 22 and portions of the side of the machine, such as the sideplate 29.

The cutting rotor location indication system can include a visual indicator system including the controller 36 which is configured to receive a first image from the camera 44 and to display on the monitor 42 a visual image indicating a location of a leading edge and a trailing edge of the cutting rotor 22 relative to the cutting surface 34. Thus, the image on the monitor 42 will show where the leading edge and trailing edge of the rotor 22 are as they cut the surface 34. The visual indicator can be any type of visual image to indicate the operator the leading and trailing edges of the location of the cutting rotor 22. As will be discussed, the visual image can include one or more lines overlaid on the monitor 42 showing the leading and trailing edges of the cutting rotor 22. In other examples, the screen image can include overlaid red and green areas showing the operator where the dangerous and safe operating zones are located. This information helps the operator maneuver the machine for reasons such as coming up to a manhole cover, for example. If the operator knows where the leading edge of the cutting rotor 22 is located, the operator can get as close as needed to the manhole cover without striking it.

Figure 2:
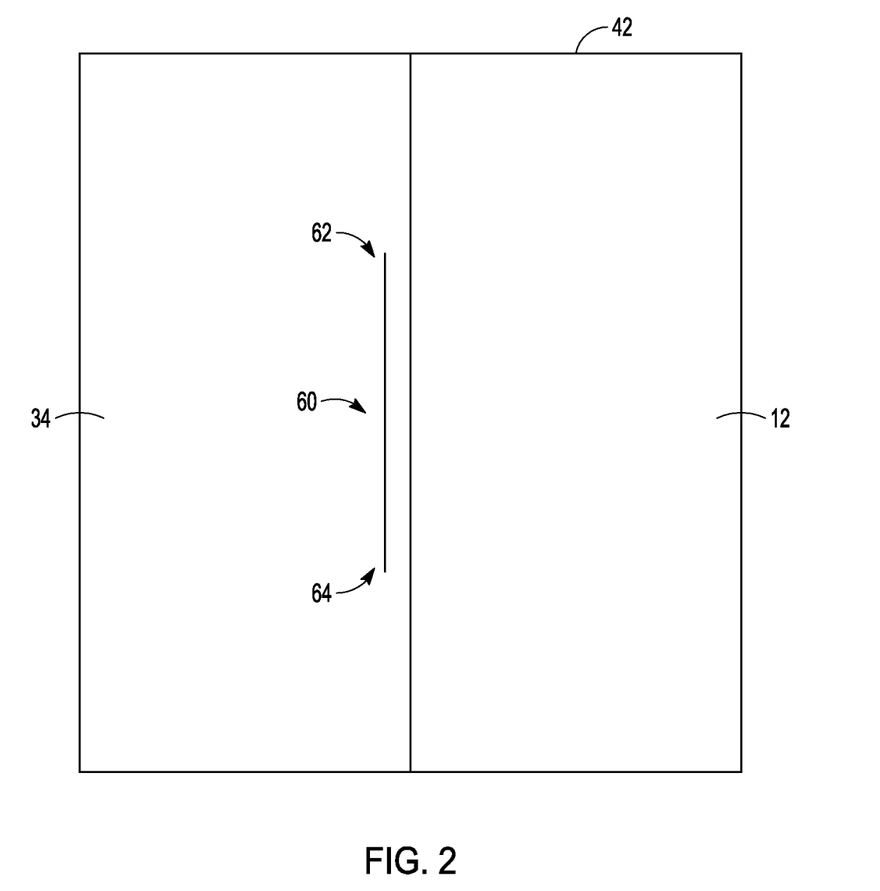
FIG. 2 shows a view of a visual display on a monitor, in accordance with one embodiment.

FIG. 2 shows the monitor 42 in accordance with one embodiment. Here the monitor 42 shows the view from the camera 44 showing a portion of the side of the frame 12 and the cutting surface 34 proximate the cutting rotor. The visual image on the monitor can include a line 60 where the ends of the line show where the leading edge 62 and trailing edge 64 of the rotor are relative to the cutting surface 34. Here, the line 60 is shown on the surface 34, but the line can be located on the surface 34, on the side of the frame 12, or both.

In one embodiment, the line 60 is formed on the monitor as a virtual image created by the controller 36 and overlaid over the image captured by the camera 44. For example, the controller 36 can receive the first image from the camera 44, and receive the depth of cut information from the sensor 50. The sensor 50 senses the amount of movement of the side plate 29 or the lifting columns 18 to determine what depth the cutting rotor 22 is at. In some examples, the operator can manually enter the depth of cut, especially when the sensed depth is not within the actual zone the operator wants to avoid. This depth of cut information is fed to the controller 36 which then determines the length of the line 60 which indicates where the leading and trailing edges of the rotor 22 are relative to the cutting surface 34. The controller 36 then outputs a second image to the monitor 42 to display on the monitor 42 the visual image of the location of the leading edge 62 and the trailing edge 64 of the cutting rotor 22 as an overlay on the image delivered by the camera 44.

The controller 36 can include hardware and software and be configured to receive, process and send information. In this embodiment, the line 60 is a virtual image created by the controller 36 and then overlaid over the image sent by the camera 44. The controller 36 base the length of the line 60 based on the depth of cut information relayed by the sensor 50.

Figure 3:
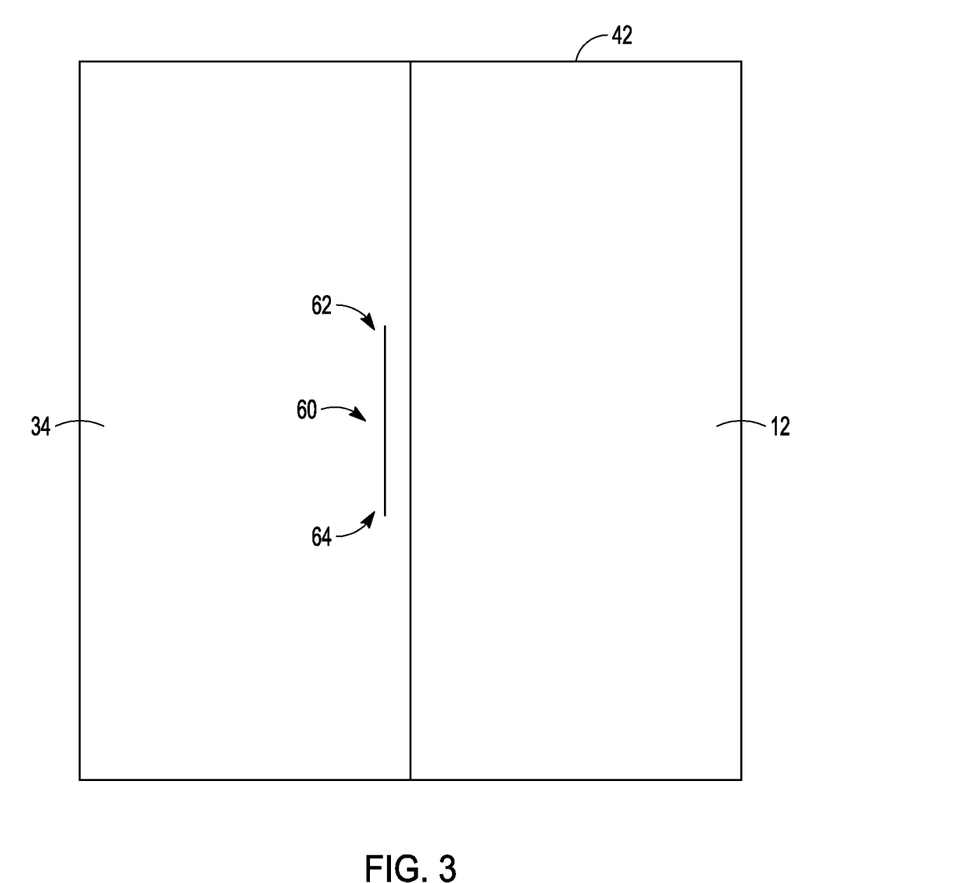
FIG. 3 shows a view of a visual display on a monitor, in accordance with one embodiment

FIG. 3 shows an example where the cutting rotor 22 is not so deeply cutting into the cutting surface 34. In this case, the line 60 is shorter because the leading edge and trailing edges of the cutting rotor 22 do not enter or exit the cutting surface very far apart. The deeper the cutting rotor 22 is into the cutting surface, the longer the line 60 will be.

Figure 4:
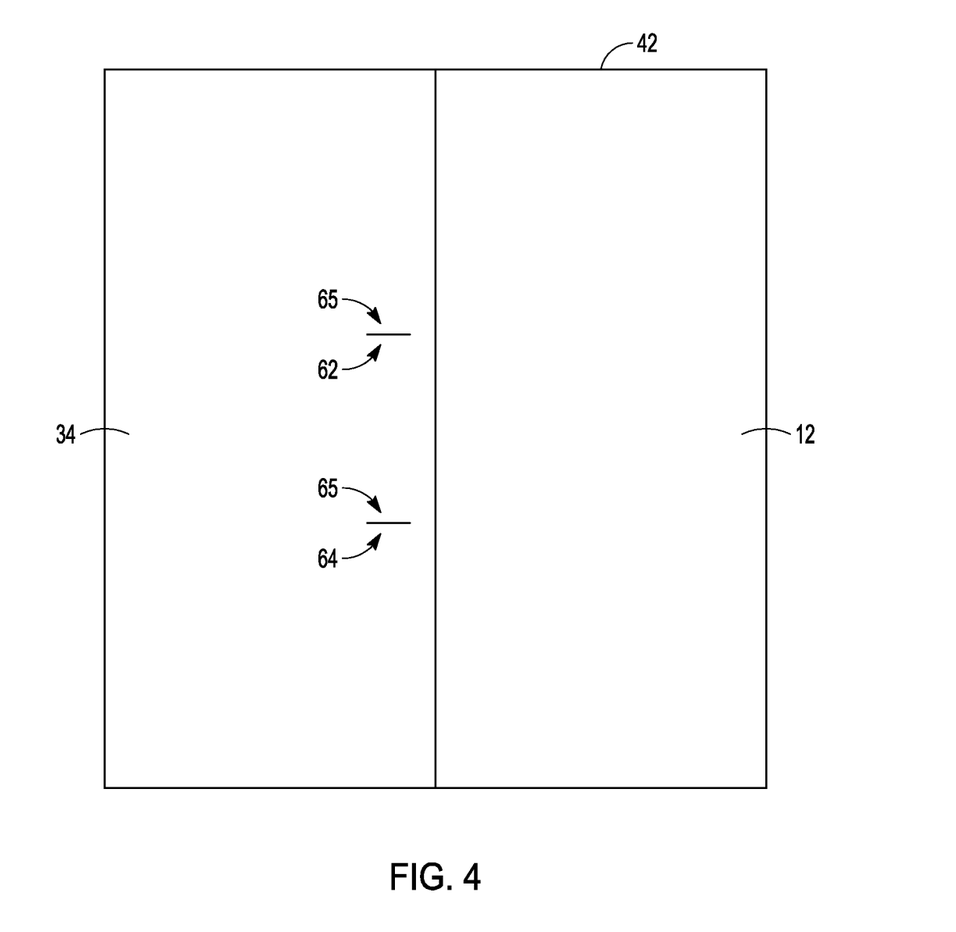
FIG. 4 shows a view of a visual display on a monitor, in accordance with one embodiment

The visual image displayed to the operator on the monitor 42 can include one or more lines displayed on the monitor 42. For example, FIG. 4 shows an embodiment where two lines 65 are depicted extending out perpendicular from the frame 12. The two lines 65 depict the leading edge 62 and trailing edge 64 of the cutting rotor 22. Other indicators or visual images can also be utilized. For example, X's, circles, or other visual indicators. As noted, the visual image of the location of the leading edge and the trailing edge of the cutting rotor grows longer when the depth of cut increases, and vice versa.

Figure 6:
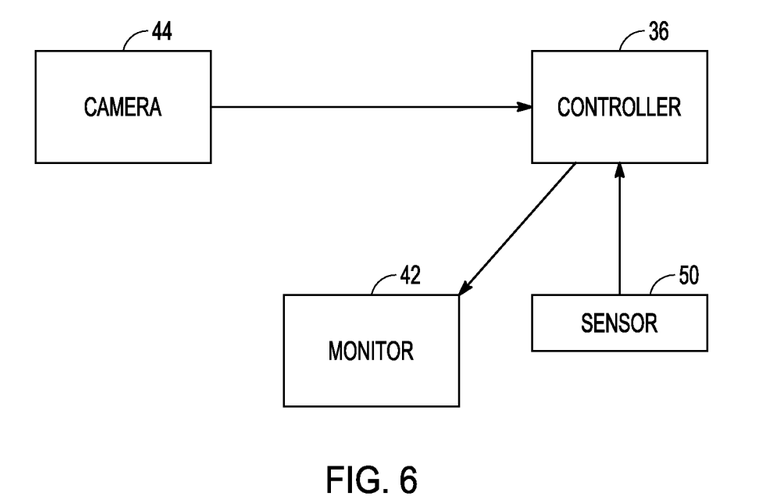
FIG. 6 shows a schematic view of a control system, in accordance with one embodiment.

FIG. 6 shows a schematic representation of this embodiment, where the sensor 50 sends the depth of cut information to the controller 36 and the controller 36 can determine where the leading and trailing edges of the cutting rotor are located. The camera 44 sends the image of the side of the machine and the cutting surface to the controller 36. The controller 36 then relays the image to the monitor 42 with the visual indicators 60, 65 overlaid on the image.

Referring again to FIG. 1, in one example, the cutting rotor location indication system can include a light 52, such as one more lasers, coupled to the frame 12 and configured to shine a light on the cutting surface 34 or the side of the frame 12. The light that is shined is indicative of the leading edge and trailing edge of the cutting rotor 22 (and corresponds to the lines 60, 65 shown in FIGS. 2-4).

Again, the controller 36 is configured to receive depth of cut information from the sensor 50. The controller in this example is configured to change the size of the light being shined depending on the depth of cut. Here, the image seen by the camera 44 includes the cutting surface 34, the side of the machine, and the light being shined by the light 52. The camera's image is then relayed to the monitor 42. This gives the operator a visual image of the location of the leading edge and the trailing edge of the cutting rotor 22. In some example, the image can be sent by the camera directly to the monitor 42. In other examples, the image can be relayed to the monitor 42 via the controller 36. Accordingly, in this example, the visual image includes a physical image actually on the cutting surface 34 and/or on the machine frame 12 to indicate to the operator where the leading and trailing edges of the cutting rotor 22 are located. The physical image is captured by the camera 44 and relayed to the monitor 42.

Here, the one or more lights 52 can be configured to shine so as to show any of the types of lines shown in FIGS. 2-4 such as the line 60, or the two lines 65, or any other type of visual indicator showing the leading and trailing edges.

Referring again to FIG. 1, in one example, the cutting rotor location indication system can include a light bar 54 coupled to the frame 12. For example, the light bar 54 can be coupled to the frame 12 proximate the side plate of the drum housing 28 of the cutting rotor 22. The light bar 54 can be configured display a light where a length of the light within the light bar 54 is indicative of the leading edge and the trailing edge of the cutting rotor 22. As before, the controller 36 receives the depth of cut information from the sensor 50 and the controller 36 changes the length of the light displayed on the light bar 54 depending on the depth of cut. The camera 44 captures an image of cutting surface 34, the side of the machine, and the light bar 54 and sends the image to the monitor 42 to display on the monitor 42 a visual image of the location of the leading edge and the trailing edge of the cutting rotor 22. In one example, the light bar 54 can be visible from the operator station and the camera 44 may not be needed. In other words, the operator can rely on the light bar alone and does not have to refer to the monitor 42.

Figure 5:
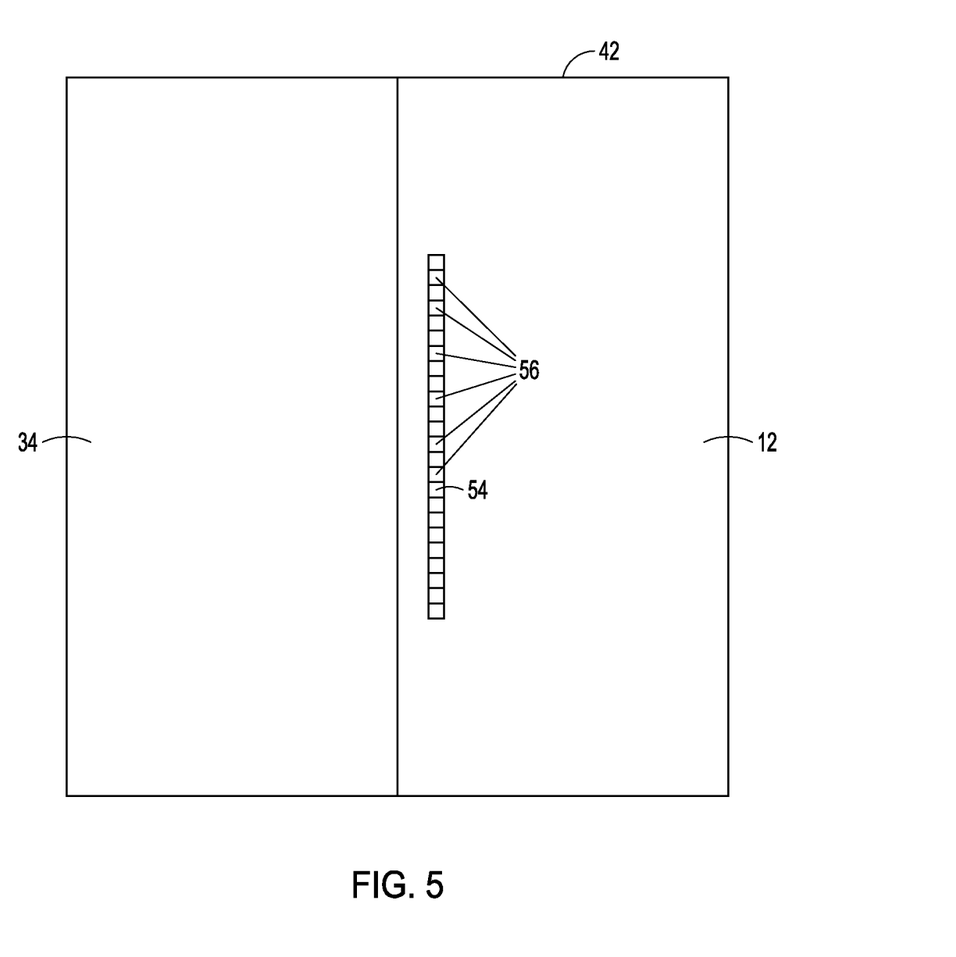
FIG. 5 shows a view of a visual display on a monitor, in accordance with one embodiment

FIG. 5 shows the visual image that can be sent to the monitor 42. Here, the camera 44 captures an image including the cutting surface 34, the side of the machine, and the light displayed by the light bar 52. In one example, the light bar 54 can include a plurality of LEDs 56 that the controller 36 can turn off and on as needed to visually depict the location of the leading and trailing edges of the cutting rotor. For example, the LEDs that are lit can be the total length of light or just portions marking the beginning and end of the line which visually depicts the location of the leading and trailing edge of the cutting rotor.

Figure 7:
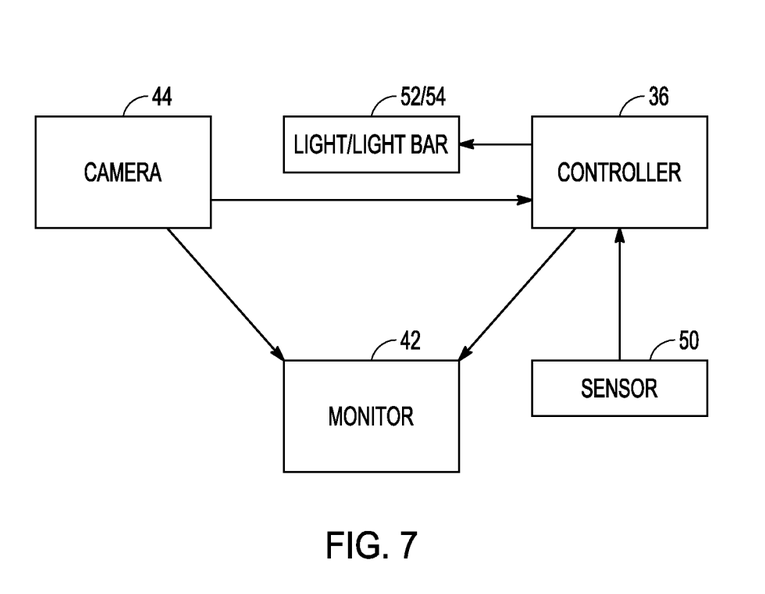
FIG. 7 shows a schematic view of a control system, in accordance with one embodiment

FIG. 7 shows a schematic representation of the light 52 and light bar 54 embodiments. Here, the sensor 50 sends the depth of cut information to the controller 50, so that the controller 36 can determine where the leading and trailing edges of the cutting rotor are located. The controller changes the light 52 or the light bar 54 accordingly. The camera 44 then takes the image of the surface 34, side of the machine, and the light and then relays the image either directly or indirectly to the monitor 42.

Referring again to FIG. 1, in one example, the cutting rotor location indication system can include a plurality of graduated markings 31 positioned on the side plate 29 of the drum housing 28. The graduated markings 31 are visual indicators of the trailing and leading edges of the cutting rotor 22 depending on the depth of cut. The operator of the milling machine 5 can be notified of the depth of cut by the controller 36 by a display in the operator station 30, such as a gauge or on the monitor 42. The camera 44 captures an image of cutting surface 34 and the side plate 29 of the machine, showing the graduated markings 31. The captured image can be displayed on the monitor 42 and by seeing the markings 31 and knowing the depth of cut, the operator can visually determine the location of the location of the leading edge and the trailing edge of the cutting rotor 22 based on the graduated marking 31.

Figure 8:
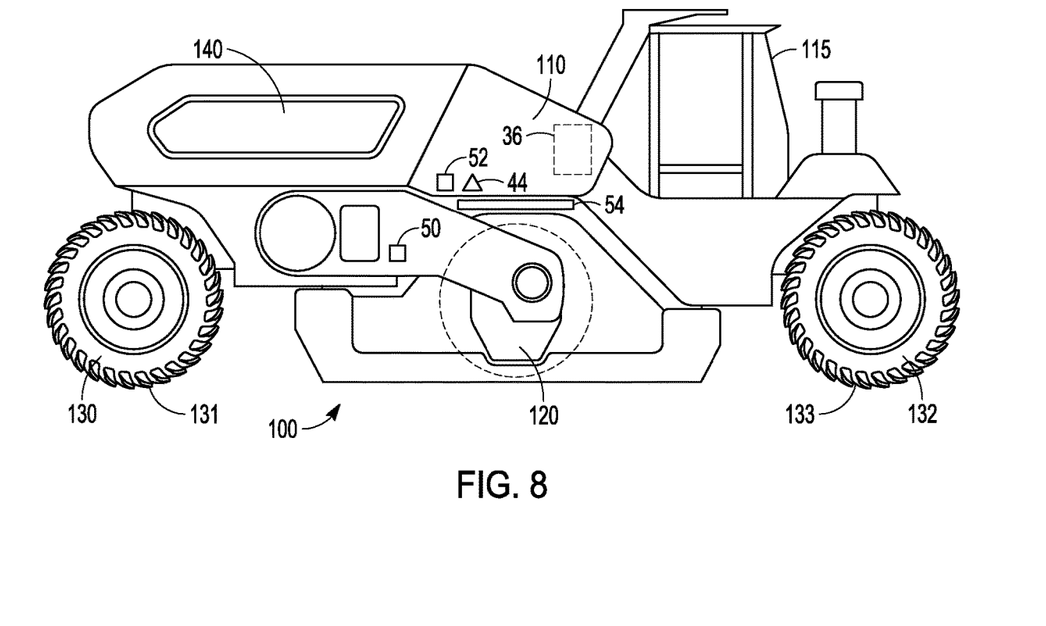
FIG. 8 shows a side view of a reclaimer, in accordance with one embodiment.

FIG. 8 shows a side view of a milling machine which is a reclaimer 100, in accordance with one embodiment. The reclaimer 100 can also be known as a rotary mixer or a soil stabilizer. The reclaimer 100 generally includes a frame 110, a rotor 120 attached to the frame 110 and contained within drum housing 122, and four wheels 130, 131, 132, 133 attached to the frame 110 for moving the rotary mixer 100. The rotary mixer 100 can also include a power source 140 such as a diesel engine, which drives the various components, and an operator station 150 which can include various controls to control the operations of the rotary mixer 100.

The rotor 120 is rotated at a predetermined depth to dig up a soil surface or asphalt surface and then to lay the soil or pulverized asphalt back down to prepare a roadbed or other ground preparation. In some examples, further stabilizing material can be added to the soil or pulverized asphalt to be mixed into the roadbed.

In this example, the reclaimer 100 can include a cutting rotor location system as discussed above. For example, the reclaimer 100 can include one or more of the sensor 50, the camera 44, and optionally, the light 44, the light bar 54, and the graduated markings on the frame 12, as discussed above. A monitor can be provided in the operator station 150 and these components allow the operator of the reclaimer to be see displayed on the monitor a visual image of a location of a leading edge and a trailing edge of the cutting rotor 120 relative to the cutting surface, in a similar manner as discussed above.

INDUSTRIAL APPLICABILITY

The present system is applicable to a milling machine such as a cold planer or a reclaimer. As noted above, on some milling machines, the side plates of the drum housing are not visible from the operator station making it hard to line up with obstacles or lines to cut. Also, being able to see helps determine the cutting rotor location at varying cut depths.

Figure 9:
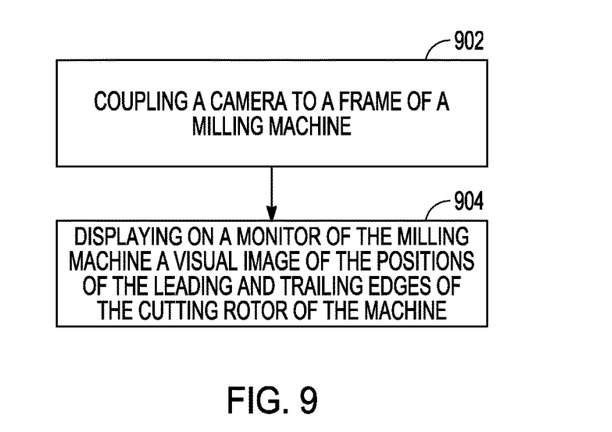
FIG. 9 shows a flowchart of a method, in accordance with one embodiment.

FIG. 9 depicts a method of providing the cutting rotor location to the operator of a milling machine. The method can include coupling (902) a camera 44 to the frame 12 of the milling machine, where the camera is positioned to capture a first image of an area proximate a cutting rotor 22 of the machine. The method further includes displaying (904) on the monitor 42 in the operator station 30 of the milling machine a visual image of a location of a leading edge and a trailing edge of the cutting rotor 22.

The method can include providing a controller 36 configured to receive the first image from the camera 44, and to receive depth of cut information from the sensor 50 on the frame 12, and to output a second image to the monitor 42 to display on the monitor 42 the visual image of the location of the leading edge and the trailing edge of the cutting rotor 22.

In another embodiment, the method can include the light 52 or the light bar 54 coupled to the frame and configured to display a light indicative of the leading edge and trailing edge of the cutting rotor 22. The controller 36 can receive depth of cut information from the sensor 50, and the controller 36 can then change the size of the light depending on the depth of cut. The camera 44 can capture an image of the light and send the image to the monitor 42 to display on the monitor the visual image of the location of the leading edge and the trailing edge of the cutting rotor.

As noted, the light can be shined onto the ground by the light 52 or can be displayed on the light bar 54 coupled to the frame.

The present system allows for greater operator control of the operation of the milling machine, by using a camera to visually see the side plate of a work machine and creating a visual indication of the location of the cutting rotor.

A visual indication of the rotor position can be provided on the milling machine (e.g. via visual markings on the side plate) or on the ground/machine (via laser or other light source, or via a light bar), and this visual indication can be picked up by the camera pointed at the region and displayed to the operator. In another example, the visual indication can be a virtual image created by the controller and overlaid on the monitor.

The above detailed description is intended to be illustrative, and not restrictive. The scope of the disclosure should, therefore, be determined with references to the appended claims, along with the full scope of equivalents to which such claims are entitled.

What is claimed is:

1. A cold planer comprising:
a frame;
an operator station coupled to the frame and including a monitor;
a cutting rotor coupled to the frame, the cutting rotor configured to be lowered a selected distance into a surface to define a depth of cut;
a conveyor to receive material from the cutting rotor; and
a cutting rotor location indication system including:
a camera coupled to the frame and oriented to show an area on a side of the frame; and
a visual indicator system configured to receive a first image from the camera and display on the monitor a visual image of a location of a leading edge and a trailing edge of the cutting rotor relative to the surface, wherein the cutting rotor location indication system further includes a light bar coupled to the frame and configured to display a light where a length of the light is indicative of the leading edge and the trailing edge of the cutting rotor; and a controller configured to receive depth of cut information from a sensor on the frame; and wherein the controller is configured to change the length of the light displayed on the light bar depending on the depth of cut; and wherein the camera captures the first image of the light bar and sends the first image to the monitor to display on the monitor the visual image of the location of the leading edge and the trailing edge of the cutting rotor.

2. The cold planer of claim 1, wherein the controller is configured to receive the first image from the camera, and to output a second image to the monitor to display on the monitor the visual image of the location of the leading edge and the trailing edge of the cutting rotor.

3. The cold planer of claim 2, wherein the first image includes a view of the surface and a portion of a side of the cold planer proximate the cutting rotor.

4. The cold planer of claim 2, wherein the visual image includes one or more lines displayed on the monitor.

5. The cold planer of claim 2, wherein the visual image of the location of the leading edge and the trailing edge of the cutting rotor grows longer when the depth of cut increases.

6. The cold planer of claim 1, wherein the cutting rotor location indication system further includes a light coupled to the frame and configured to shine a light indicative of the leading edge and trailing edge of the cutting rotor; and wherein the controller is configured to change the size of the light being shined depending on the depth of cut; and wherein the camera captures the first image of the light being shined and relays the first image to the monitor to display on the monitor the visual image of the location of the leading edge and the trailing edge of the cutting rotor.

7. The cold planer of claim 6, wherein the light includes one or more lasers configured to display one or more lines of light on the surface proximate the cold planer or on the cold planer frame.

8. The cold planer of claim 1, wherein the light bar is coupled to the frame proximate a side plate of a housing of the cutting rotor.

9. A milling machine comprising:
a frame;
an operator station coupled to the frame and including a monitor;
a cutting rotor coupled to the frame, the cutting rotor configured to be lowered a selected distance into a surface to define a depth of cut;
a cutting rotor location indication system including:
a camera coupled to the frame and oriented to show an area on a side of the frame; and
a visual indicator system configured to receive a first image from the camera and display on the monitor a visual image of a location of a leading edge and a trailing edge of the cutting rotor relative to the surface, wherein the first image includes a view of the surface adjacent the side of the frame and a portion of a side of the milling machine proximate the cutting rotor.

10. The milling machine of claim 9, wherein the cutting rotor location indication system further includes a controller configured to receive the first image from the camera, and to receive depth of cut information from a sensor on the machine, and to output a second image to the monitor to display on the monitor the visual image of the location of the leading edge and the trailing edge of the cutting rotor.

11. The milling machine of claim 10, wherein the visual image includes one or more lines displayed on the monitor.

12. The milling machine of claim 10, wherein the visual image of the location of the leading edge and the trailing edge of the cutting rotor grows longer when the depth of cut increases.

13. The milling machine of claim 9, wherein the cutting rotor location indication system further includes a light coupled to the frame and configured to shine a light indicative of the leading edge and trailing edge of the cutting rotor; and a controller configured to receive depth of cut information from a sensor on the frame; and wherein the controller is configured to change the size of the light being shined depending on the depth of cut; and wherein the camera captures the first image of the light being shined and relays the first image to the monitor to display on the monitor the visual image of the location of the leading edge and the trailing edge of the cutting rotor.

14. The milling machine of claim 13, wherein light includes one or more lasers configured to display one or more lines of light on the surface proximate the milling machine or on the frame of the milling machine.

15. The milling machine of claim 9, wherein the cutting rotor location indication system further includes a light bar coupled to the frame and configured display a light where a length of the light is indicative of the leading edge and the trailing edge of the cutting rotor; and a controller configured to receive depth of cut information from a sensor on the frame; and wherein the controller is configured to change the length of the light displayed on the light bar depending on the depth of cut; and wherein the camera captures the first image of the light bar and sends the first image to the monitor to display on the monitor the visual image of the location of the leading edge and the trailing edge of the cutting rotor.

16. A method of providing a cutting rotor location to an operator of a milling machine, the method comprising:

coupling a camera to a frame of the milling machine, the camera positioned to capture a first image of an area proximate a cutting rotor of the machine, wherein the first image includes a view of a cutting surface adjacent a side of the frame and a portion of a side of the milling machine proximate the cutting rotor; and displaying on a monitor in an operator station of the milling machine the first image from the camera and a visual image of a location of a leading edge and a trailing edge of the cutting rotor relative to the cutting surface.

17. The method of claim 16, wherein the method further includes providing a controller configured to receive the first image from the camera, and to receive depth of cut information from a sensor on the frame, and to output a second image to the monitor to display on the monitor the visual image of the location of the leading edge and the trailing edge of the cutting rotor.

18. The method of claim 16, wherein the method further includes a light coupled to the frame and configured to display a light indicative of the leading edge and trailing edge of the cutting rotor; and a controller to receive depth of cut information from a sensor on the frame; and wherein the controller is configured to change the size of the light depending on the depth of cut; and wherein the camera can capture an image of the light and send the image to the monitor to display on the monitor the visual image of the location of the leading edge and the trailing edge of the cutting rotor.

19. The method of claim 16, wherein the method further includes a light bar coupled to the frame and configured to display a light where a length of the light is indicative of the leading edge and the trailing edge of the cutting rotor; and a controller configured to receive depth of cut information from a sensor on the frame; and wherein the controller is configured to change the length of the light displayed on the light bar depending on the depth of cut; and wherein the camera captures the first image of the light bar and sends the first image to the monitor to display on the monitor the visual image of the location of the leading edge and the trailing edge of the cutting rotor.

\* \* \* \* \*